(12) United States Patent
Le Saout et al.

(10) Patent No.: US 11,512,443 B2
(45) Date of Patent: Nov. 29, 2022

(54) MANHOLE COVER TRANSPARENT TO RADIOFREQUENCY SIGNALS

(71) Applicant: Orange, Paris (FR)

(72) Inventors: Jean-Yves Le Saout, Châtillon (FR); Laurent Coiffard, Châtillon (FR); Dominique Davranche, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 256 days.

(21) Appl. No.: 16/650,302

(22) PCT Filed: Sep. 11, 2018

(86) PCT No.: PCT/FR2018/052212
§ 371 (c)(1),
(2) Date: Mar. 24, 2020

(87) PCT Pub. No.: WO2019/063901
PCT Pub. Date: Apr. 4, 2019

(65) Prior Publication Data
US 2020/0291598 A1    Sep. 17, 2020

(30) Foreign Application Priority Data
Sep. 26, 2017    (FR) ...................... 1758880

(51) Int. Cl.
*E02D 29/14*    (2006.01)
*H01Q 1/38*    (2006.01)
(52) U.S. Cl.
CPC ............. *E02D 29/14* (2013.01); *H01Q 1/38* (2013.01)
(58) Field of Classification Search
CPC ..................................................... E02D 29/14
(Continued)

(56) References Cited

U.S. PATENT DOCUMENTS

| X8612 I1 | * | 1/1835 | Kidder | .................... E02D 29/14 52/20 |
| 6,035,581 | A * | 3/2000 | McCoy | ............... E02D 29/1427 404/25 |

(Continued)

FOREIGN PATENT DOCUMENTS

| CA | 2862457 A1 * | 3/2016 | ............. E02D 29/14 |
| CN | 202 430 746 U | 9/2012 | |

(Continued)

OTHER PUBLICATIONS

Machine Translation for Yao Masayuki et al. JP H1166484 A With Bibliographic Info, Description and Claims Retrieved From https://worldwide.espacenet.com/publicationDetails/biblio?CC=JP&NR=H1166484A&KC=A&FT=D& ND=3&date=19990309&DB=EPODOC&locale=en_EP (Year: 2022).*

(Continued)

*Primary Examiner* — Brian D Mattei
*Assistant Examiner* — Joseph J. Sadlon
(74) *Attorney, Agent, or Firm* — Knobbe, Martens, Olson & Bear, LLP

(57) ABSTRACT

A manhole cover for a manhole provided with an access opening and suitable for containing a device for transmitting a radiofrequency signal is described. The cover includes a wall for covering the access opening when the cover is in a closed position, where the wall includes at least one through-opening filled with a sealing material, the sealing material extending over the surface of the wall of the cover that is oriented towards the inside of the manhole when the cover is in a closed position, the sealing material comprising a material that is transparent to the propagation of a radiofrequency signal transmitted from and/or to the transmission device.

5 Claims, 6 Drawing Sheets

(58) Field of Classification Search
USPC .......................................................... 52/20
See application file for complete search history.

(56) References Cited

U.S. PATENT DOCUMENTS

| | | | | |
|---|---|---|---|---|
| 6,109,822 | A * | 8/2000 | Campbell | E02D 29/14 |
| | | | | 404/25 |
| 7,079,773 | B2 * | 7/2006 | Cordier | H04B 10/806 |
| | | | | 398/104 |
| 7,579,999 | B2 * | 8/2009 | Boβ | H01Q 9/06 |
| | | | | 343/795 |
| 8,258,977 | B1 * | 9/2012 | Montestruque | H04Q 9/00 |
| | | | | 340/870.02 |
| 9,048,544 | B2 * | 6/2015 | Georgiadis | H01Q 3/42 |
| 9,755,316 | B2 * | 9/2017 | Thain | H05K 9/0001 |
| 9,784,650 | B1 * | 10/2017 | Neathery | E02D 29/14 |
| 9,961,418 | B2 * | 5/2018 | Rodriguez, Jr. | H04L 63/0428 |
| 9,981,731 | B2 * | 5/2018 | Allcorn | B64B 1/06 |
| 10,309,077 | B2 * | 6/2019 | Kim | H01Q 5/364 |
| 11,060,754 | B2 * | 7/2021 | Bertini | F24F 13/02 |
| 11,264,710 | B2 * | 3/2022 | Rodriguez, Jr. | H01Q 1/241 |
| 2001/0011009 | A1 * | 8/2001 | Harada | E02D 29/1481 |
| | | | | 455/39 |
| 2016/0118707 | A1 * | 4/2016 | Burrell | H01Q 1/40 |
| | | | | 343/720 |
| 2017/0359094 | A1 * | 12/2017 | Koo | E02D 29/14 |

FOREIGN PATENT DOCUMENTS

| | | |
|---|---|---|
| CN | 203 403 444 U | 1/2014 |
| DE | 10 2015 007505 B3 | 9/2016 |
| FR | 2 747 867 A1 | 10/1997 |
| JP | H11 66484 A | 3/1999 |
| JP | 2001 156514 A | 6/2001 |
| KR | 2017 0062354 A | 6/2017 |
| WO | WO 2017/074205 A1 | 5/2017 |

OTHER PUBLICATIONS

International Search Report and Written Opinion dated Nov. 22, 2018 for Application No. PCT/FR2018/052212.

* cited by examiner

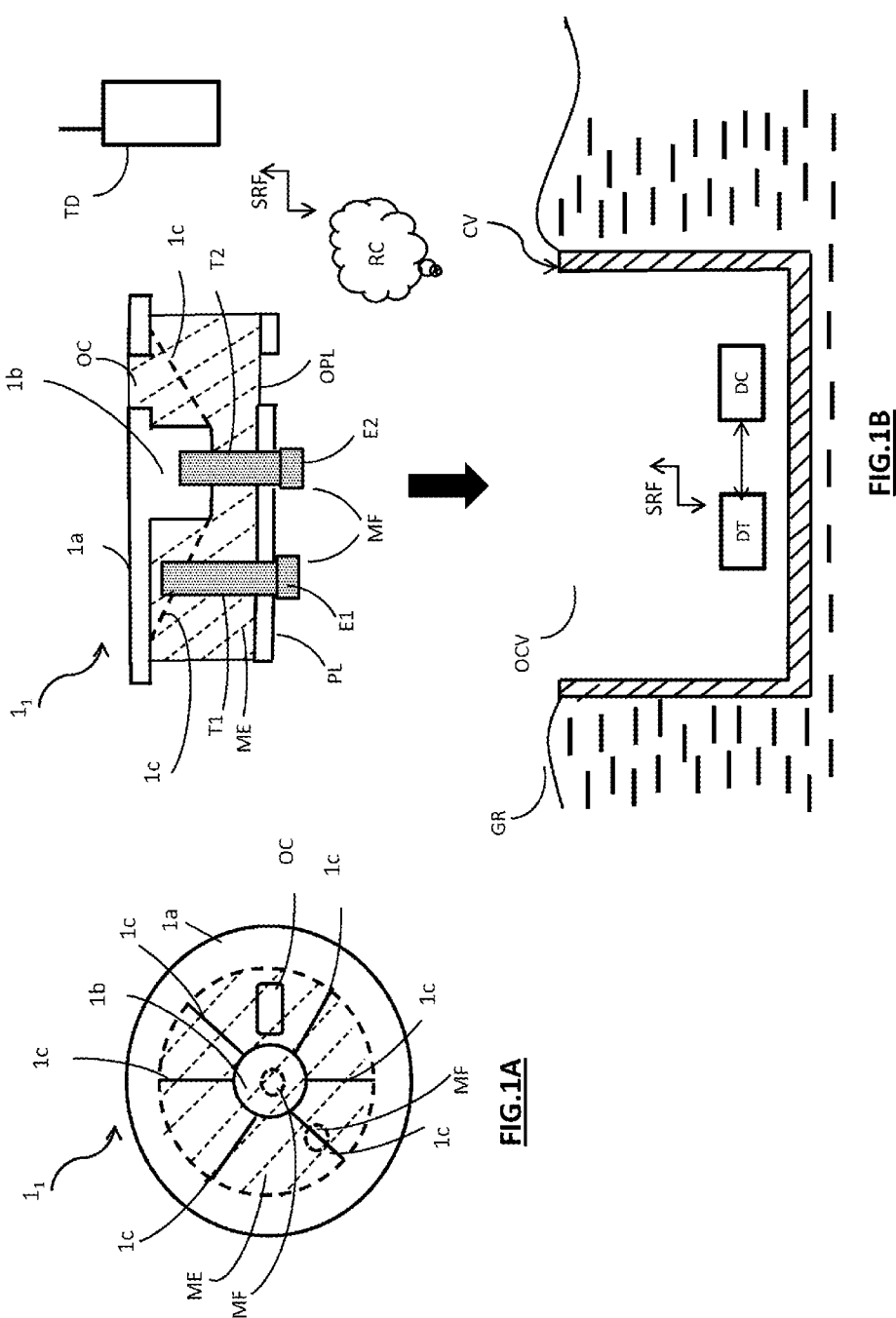

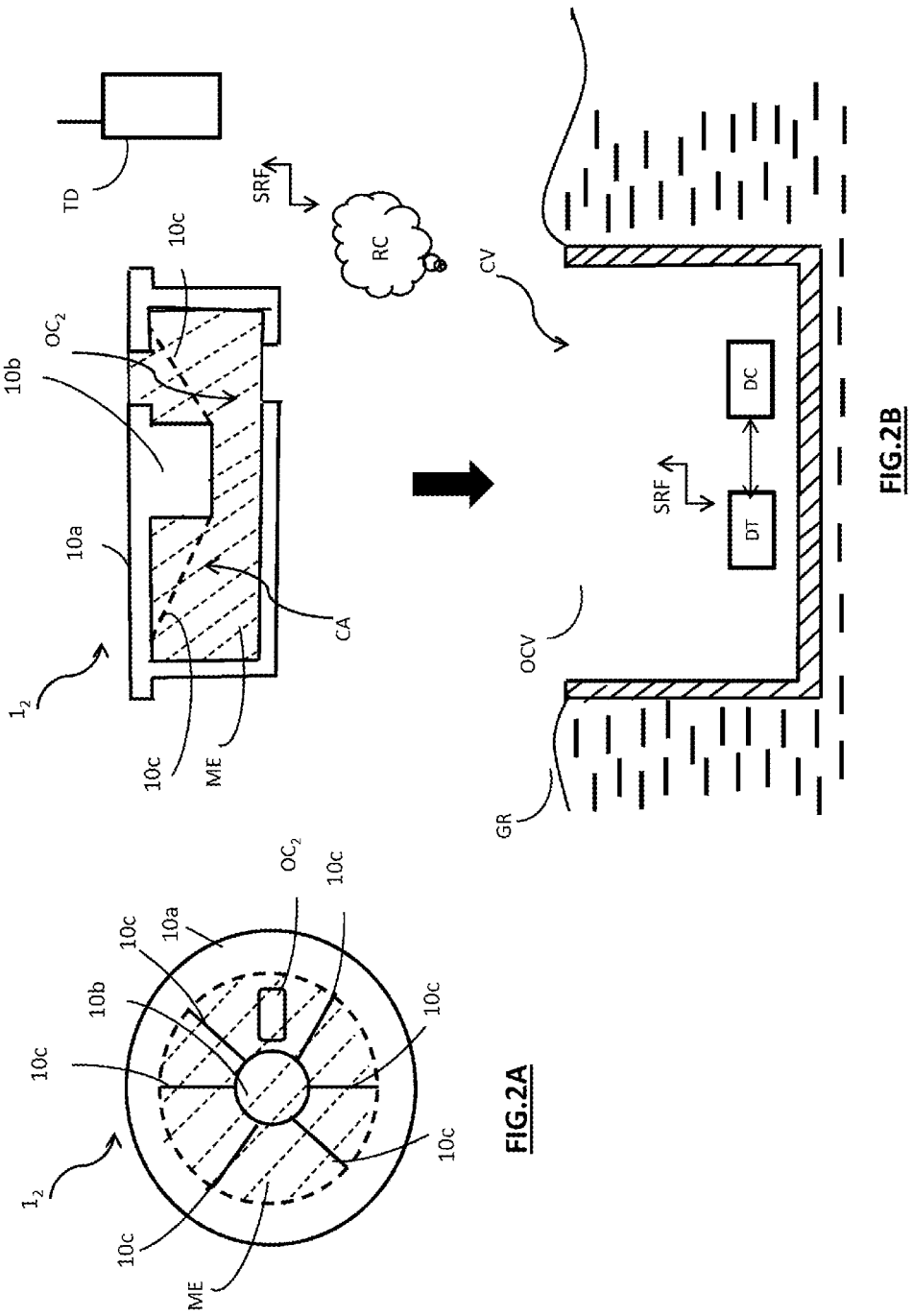

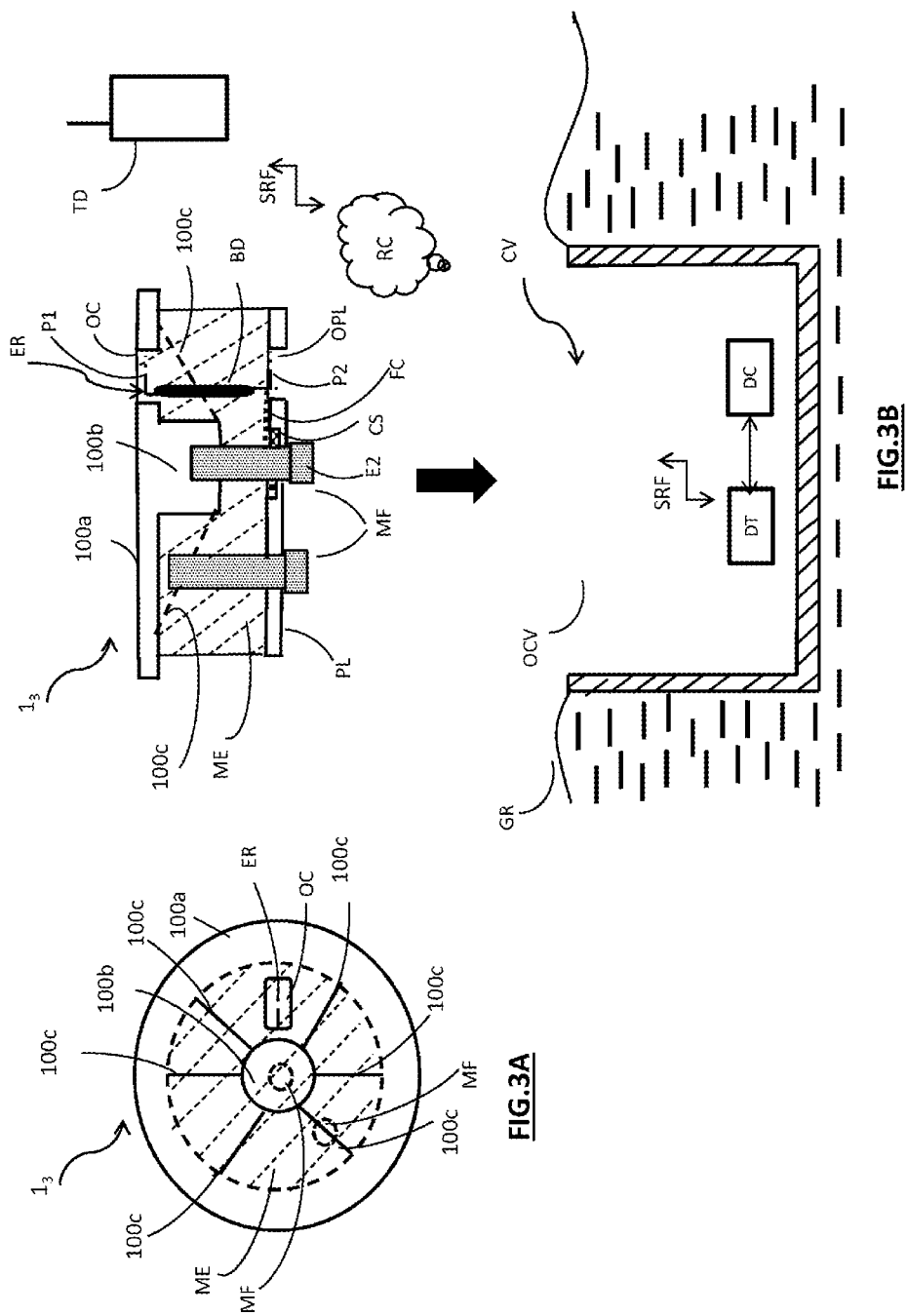

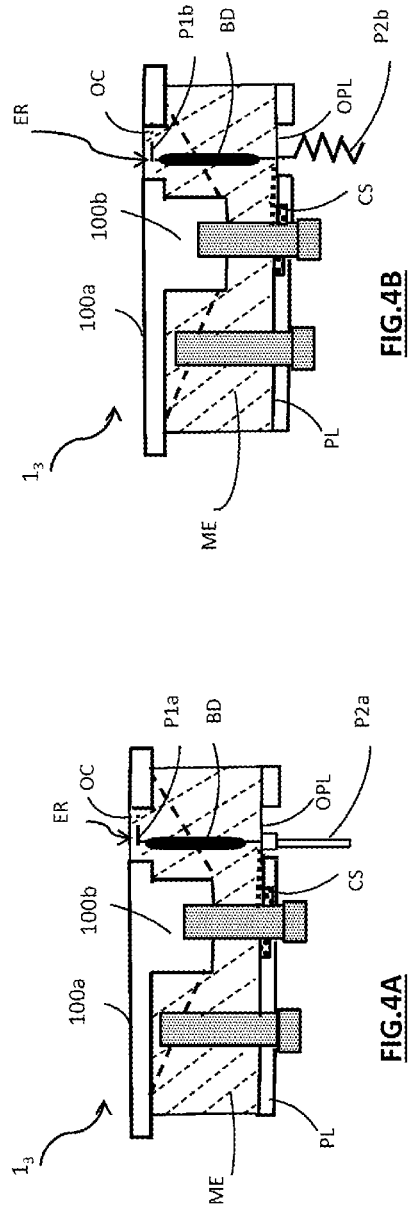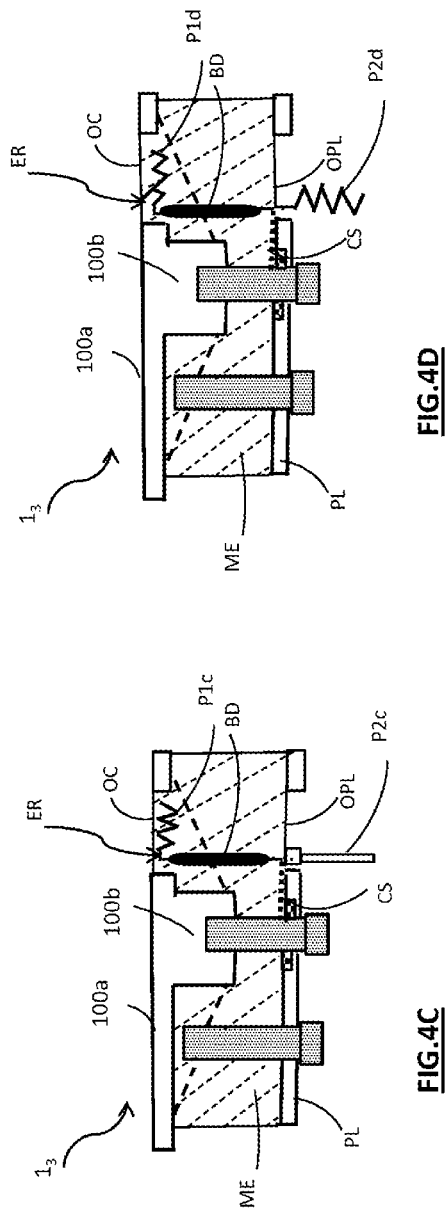

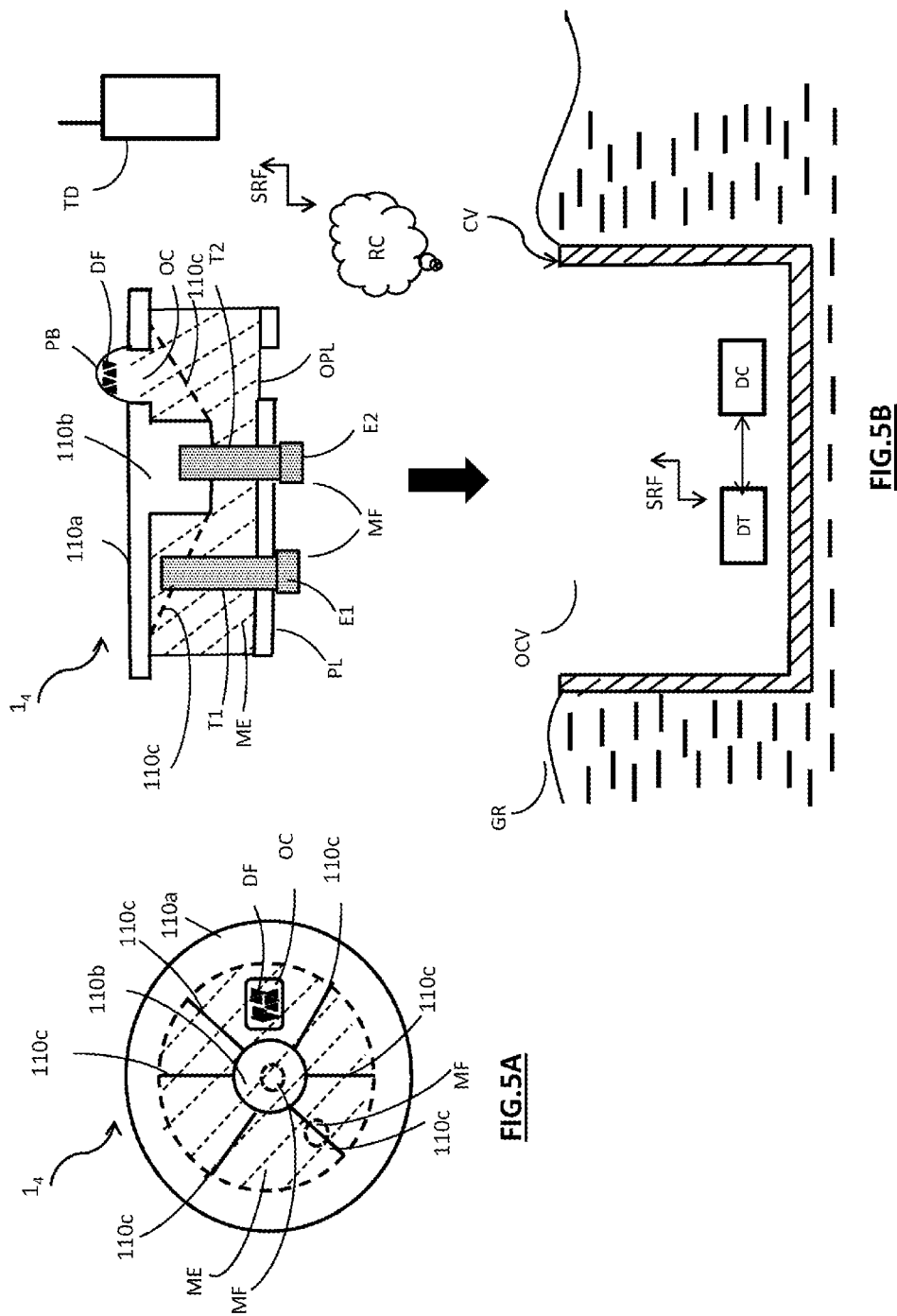

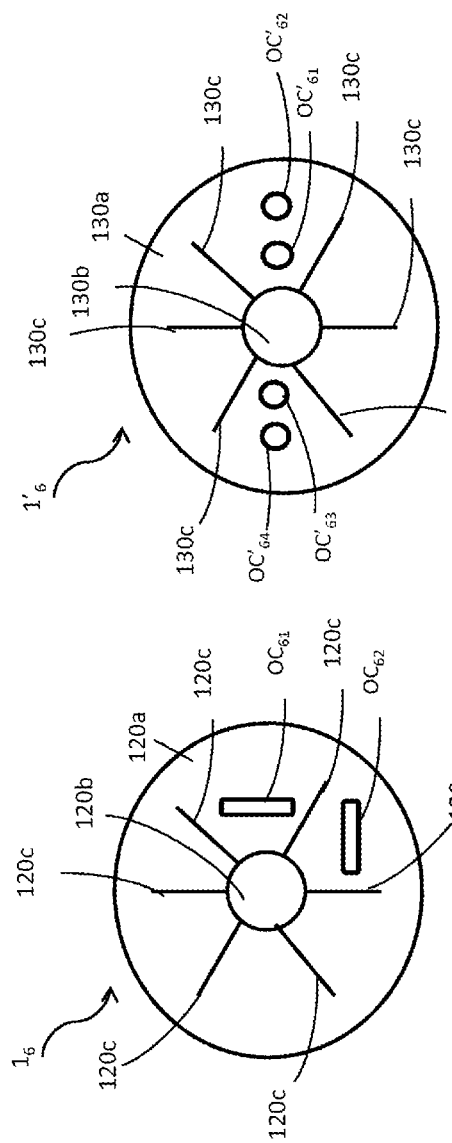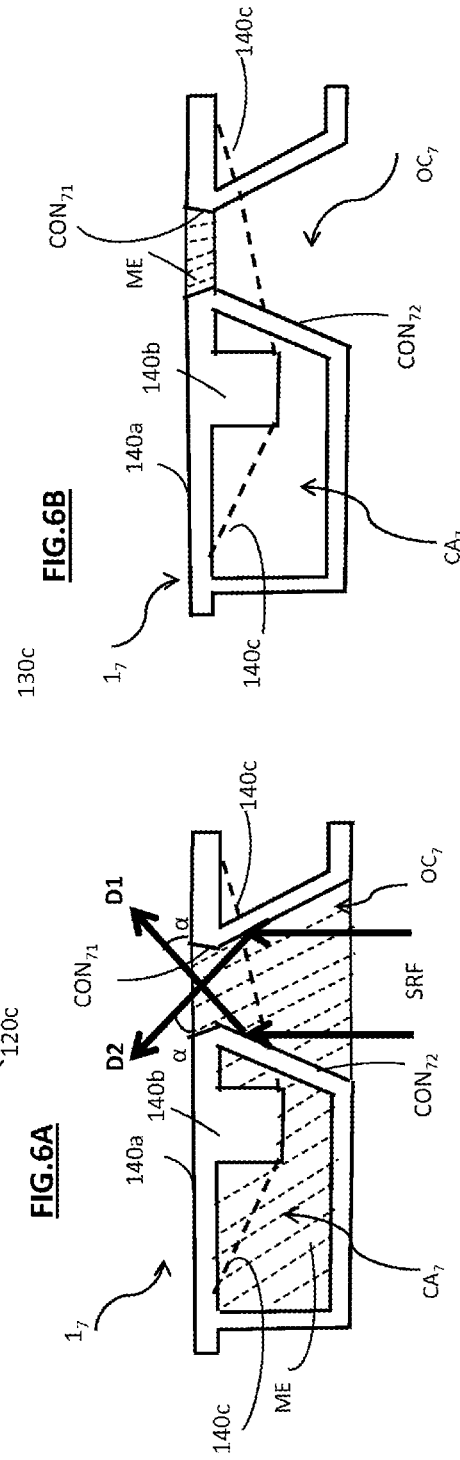

MANHOLE COVER TRANSPARENT TO RADIOFREQUENCY SIGNALS

RELATED APPLICATIONS

This application is the U.S. National Phase of Application No. PCT/FR2018/052212 entitled "MANHOLE COVER TRANSPARENT TO RADIOFREQUENCY SIGNALS" and filed Sep. 11, 2018, which claims the benefit of French Patent Application No. 1758880, filed Sep. 26, 2017, each of which is incorporated by reference in its entirety.

FIELD OF THE INVENTION

The present invention relates to an inspection chamber cover, said chamber being suitable for containing a radiofrequency signal transmission device.

BACKGROUND OF THE INVENTION

Currently, the inspection chambers which are used in urban networks, such as the water, electricity, gas or telecommunications networks, are generally made of concrete and installed in the earth with the top part open and flush with the level of the ground (roadway, sidewalk, central reservation, etc.). These chambers are provided with an opening that is closed by a cover which can also be made of concrete but which is more often than not made of metal, such as, for example, cast iron, steel or aluminum. Thus, such a cover has a high mechanical strength which allows vehicle traffic, even heavy vehicles such as trucks.

Such inspection chambers are increasingly "connected", in that they shelter at least one radiofrequency signal transmission device making it possible to transmit/receive information via a wireless communication network. According to one example, an abovementioned transmission device is linked to one or more pulse sensors capable of recovering water, electricity, gas or telecommunications consumption data which are then transmitted by the transmission device to a remote terminal (e.g.: computer, tablet, cellphone), via a wireless network. It is thus possible to track, remotely, automatically and virtually in real time, the consumption readings of the users, in order to supply the latter with reliable billing. Such sensors are also used to identify and locate degradations affecting these networks, such as leaks of water or of gas, electrical cable breaks, etc., the location and identification information being transmitted also via a wireless communication network to a remote terminal, which allows the maintenance teams to act as quickly as possible.

One drawback with such connected chambers lies in the fact that they do not favor a good propagation of the radiofrequency signals transmitted or received by the radiofrequency transmission devices that they shelter, notably for the following reasons:
  they are installed in earth,
  they are more often than not composed of metal or of concrete,
  the cover which covers them is also more often than not composed of a metal or concrete plate.

The result thereof is that the current structure of the inspection chambers and of their corresponding covers constitutes a brake on the widescale development of such radiofrequency transmission installations. The use of these installations therefore remains very limited.

OBJECT AND SUMMARY OF THE INVENTION

One of the aims of the invention is to remedy the drawbacks of the abovementioned state of the art.

To this end, one object of the present invention relates to an inspection chamber cover, such a chamber being provided with an access opening and being suitable for containing a radiofrequency signal transmission device, the cover comprising a wall intended to cover the access opening of the inspection chamber when the cover is in closed position.

Such a cover is noteworthy in that the wall of the cover is pierced with at least one through opening filled with a cover sealing material, said material extending over the surface of the wall of the cover which is oriented toward the inside of the inspection chamber when the cover is in closed position, said material being composed of a material transparent to the propagation of a radiofrequency signal transmitted from and/or to the transmission device.

Such a configuration of the cover makes it possible to improve the propagation of the radiofrequency signals both toward the outside of the chamber and toward the inside of the chamber, and to do so independently of the material of which the cover and the inspection chamber that it covers are composed. Such a propagation is facilitated by the fact that the radiofrequency signal transmission device is only separated from the outside of the chamber by the cover formed by the through opening and the cover sealing material, the material of which is advantageously adapted to be also transparent to radiofrequency signals.

By virtue of this configuration, the cover is also simple to manufacture and inexpensive. Moreover, such a configuration can advantageously be implemented both on existing or future inspection chamber covers, whether these covers are composed of a material that is tight to the radiofrequency signals, such as concrete, cast iron, steel or aluminum, or a material that is not tight to the radiofrequency signals, such as plastic (polyvinyl chloride (PVC), polypropylene, etc.).

According to a particular embodiment, the wall of the cover is pierced with two longitudinal through openings which are disposed at right angles to one another.

Such a configuration of the openings makes it possible to favor the propagation both of the vertical component of the radiofrequency signal and of the horizontal component thereof.

According to another particular embodiment, the sealing material contains at least one radiating element.

Such a configuration makes it possible to augment the radiofrequency signal radiation performance levels to the outside, and to the inside of the inspection chamber. Moreover, such a configuration is much more compact than in the prior art.

According to another particular embodiment, said at least one radiating element comprises first and second parts linked together by a conductive element covered with a shielding and electrically insulated from this shielding, said at least one radiating element being arranged at least partly in the sealing material so that, when the cover is in closed position:
  the first part of the radiating element is arranged, according to a given orientation with respect to the wall of the cover, in proximity to the end of the through opening of the cover which emerges toward the outside of the cover,
  the second part of the radiating element is arranged, according to a given orientation with respect to the wall of the cover, in proximity to the end of the through opening which emerges toward the inside of the inspection chamber,
  the shielding being also linked to the wall of the ground-forming cover.

Such a structure of the radiating element and such a disposition of the radiating element at least partly in the sealing material of the cover makes it possible to optimize the radiofrequency signal radiation performance levels toward the outside, and toward the inside of the inspection chamber.

According to another particular embodiment, the sealing material of the cover comprises a protuberance at the end of the through opening which emerges toward the outside of the cover, when the cover is in closed position, said protuberance incorporating a diffraction device.

Such an arrangement of a diffraction device protruding on the cover advantageously makes it possible to generate diffractions which favor the propagation of the radio waves in at least two directions each exhibiting an angle of low value (for example 3 to 5 degrees) with respect to a straight line which can be for example:

horizontal, in the case where the cover in closed position extends horizontally,
vertical, in the case where the cover in closed position extends vertically.

The abovementioned various embodiments or features can be added independently or in combination with one another to the inspection chamber cover as defined above.

BRIEF DESCRIPTION OF THE DRAWINGS

Other features and advantages will emerge on reading of preferred embodiments described with reference to the figures in which:

FIGS. 1A and 1B respectively represent the plan view and the cross-sectional view of an inspection chamber cover, in accordance with a first embodiment, FIGS. 2A and 2B respectively represent the plan view and the cross-sectional view of an inspection chamber cover, in accordance with a second embodiment, FIGS. 3A and 3B respectively represent the plan view and the cross-sectional view of an inspection chamber cover, in accordance with a third embodiment, FIGS. 4A to 4D respectively represent, in cross section, four variants of the embodiment of FIGS. 3A and 3B, FIGS. 5A and 5B respectively represent the plan view and the cross-sectional view of an inspection chamber cover, in accordance with a fourth embodiment, FIGS. 6A and 6B respectively represent, in plan view, two variant embodiments of the covers represented in FIGS. 1A to 5B, FIGS. 7A and 7B respectively represent, in cross-sectional view, two variant embodiments of the cover represented in FIGS. 2A and 2B.

EXAMPLES OF IMPLEMENTATION

A first embodiment of the inspection chamber cover, according to the invention is described with reference to FIGS. 1A and 1B.

Referring to FIGS. 1A and 1B, the inspection chamber cover is denoted by the reference $1_1$. It comprises a flat wall $1a$ which, in the example represented, has a substantially circular form. Obviously, the flat wall $1a$ could have other forms corresponding to the form of the opening of the inspection chamber to be covered which is not necessarily of circular form. To this end, the flat wall $1a$ could be of rectangular, square, oval or other form.

As represented in FIG. 1B, an inspection chamber CV is installed under the ground GR which is, for example, a roadway, a sidewalk, a central reservation, a floor, a screed, etc.

This example is in no way limiting. Indeed, according to another example, the inspection chamber CV could be installed behind a vertical wall, such as a wall, formwork, etc.

In the example represented, the inspection chamber CV has a wall of U-shaped section. Obviously, other forms of sections are possible depending on the configuration or the nature of the urban network. The inspection chamber CV is provided with an opening OCV emerging at ground level GR. Such an opening OCV allows access to the inside of the inspection chamber in order, for example, to carry out inspection, maintenance or other operations on elements (cables, pipelines, meters, etc.) which make up the water, electricity, gas or telecommunications networks.

The inspection chamber CV is adapted to contain a device DC for collecting operating data from the urban network concerned. In the example represented, the data collection device DC is a pulse sensor intended to perform a reading of the water, gas or other consumption supplied by the network concerned, for each user. According to another example and depending on the nature and configuration of the urban network concerned, the data collection device DC could be a water leak detector, a smoke detector, a cable break detector, etc.

The collection device DC is linked to a radiofrequency signal transmission device DT. The transmission device DT is responsible for encapsulating the operating data read by the collection device DC in a radiofrequency signal SRF and transmitting the radiofrequency signal SRF to a remote terminal TD, such as, for example, a computer, a cellphone, a smartphone, a tablet, etc., via a communication network RC of cellular type or even dedicated to the internet of things.

When the cover $1_1$ is in closed position the latter rests on the opening OCV of the inspection chamber CV so as to entirely cover this opening.

Conventionally, and consequently not represented, the cover $1_1$ can for example be pushed manually over the opening OCV, the edges of the cover bearing on the roadway. According to another conventional example, the cover $1_1$ is articulated on a frame that can be fitted into the access opening of the inspection chamber. In closed position, the cover is then lowered by pivoting to cover the access opening of the inspection chamber.

The wall is of the cover $1_1$ is for example metal (e.g.: cast iron, steel, aluminum, etc.). According to another example, the wall $1a$ of the cover $1_1$ is made of plastic material (e.g.: polyvinyl chloride (PVC), polypropylene, etc.).

Conventionally, the wall $1a$ of the cover is for example provided with a central web $1b$ and with several reinforcing ribs $1c$ which are made of a piece with the wall $1a$ and which extend respectively protruding into the opening OCV of the inspection chamber CV, when the cover $1_1$ is in closed position.

In the example represented, there are six reinforcing ribs. This example is in no way limiting and the number of reinforcing ribs depends on the strain resistance desired for the cover $1_1$.

According to the invention, the wall $1a$ of the cover $1_1$ is pierced with a through opening OC, the section of which is for example quadrangular. According to other examples that are not represented, the section of the through opening can be tapered, cylindrical, oval, etc. The size, the form and the positioning of the through opening OC depend on the mechanical stresses desired for the cover $1_1$.

According to the invention, the through opening OC is also filled with a sealing material ME of the cover $1_1$ which is preferably of a single piece and which extends also over the surface of the wall 1a of the cover which is oriented toward the inside of the inspection chamber CV when the cover $1_1$ is in closed position. Such a sealing material ME makes it possible to avoid the flow of fluids (e.g.: water, oil, solvent, etc.) or the ingress of miscellaneous particles (e.g.: gravel, litter, foodstuff, dust, etc.) into the opening OCV of the inspection chamber CV, when the cover $1_1$ is in closed position.

According to the invention, the sealing material ME is also advantageously composed of a material that is transparent to the propagation of any radiofrequency signal SRF transmitted from and/or to the transmission device DT, when the cover $1_1$ is in closed position.

This transparent material exhibits mechanical properties suited to the mechanical stresses envisaged for the cover $1_1$. Thus, according to an example, the transparent material is a polymer, such as rubber, plastic, PTFE. According to a preferential exemplary embodiment, the sealing material ME is an EPDM (acronym for ethylene-propylene-diene-monomer) rubber which, beyond having excellent electrical insulation properties, is resistant to cold, to heat, to UV, to abrasion, to water, to oils and to detergents. Such a material also has the advantage of being able to be tinted with the same color as the cover $1_1$ so as to restore the visual uniformity thereof, when the latter is in closed position.

According to another example, the transparent material which constitutes the sealing material ME is laminated or tempered glass.

In the example represented, the sealing material is fixed to the wall 1a of the cover $1_1$ via a plate PL which is secured to the wall 1a of the cover $1_1$ using any conventional fixing means MF, such as, for example, screws, threaded rods and their corresponding nuts, rivets, etc.

In the example represented, the fixing means MF are composed of two threaded rods T1, T2 and their corresponding nuts E1, E2, one of which is screwed into the central web 1b of the wall 1a of the cover $1_1$ and the other of which is screwed into a rib 1c of the wall 1a.

According to another example that is not represented, the fixing means MF could be composed of two threaded rods force-fitted into the wall 1a of the cover $1_1$ and be "mated" or riveted at the plate PL.

The plate PL also has dimensions corresponding to the internal dimensions of the access opening OCV of the inspection chamber CV. The plate PL is also pierced with a through hole OPL which has the same dimensions as the through hole OC formed in the wall 1a of the cover and which is disposed facing the through hole OC, once the plate PL is fixed to the wall 1a, parallel to the wall 1a of the cover $1_1$.

In order to even further improve the sealing of the cover $1_1$, a seal which is not represented, for example made of silicone, can be arranged on the perimeter of the through opening OC of the wall 1a of the cover.

Such a configuration of the cover $1_1$ which has just been described above is particularly advantageous in that it can be envisaged both on existing inspection chamber covers and on future inspection chamber covers.

The cover $1_1$ that is thus obtained is provided with a tight "plug" which is compact, easy to install and inexpensive and which, when the cover is in closed position, makes it possible to substantially improve the propagation of the radiofrequency signals both toward the outside of the inspection chamber CV and toward the inside thereof, and do so independently of the material of which the cover $1_1$ and the inspection chamber CV are composed.

According to a second embodiment represented in FIGS. 2A and 2B, there is proposed a configuration of the inspection chamber cover which is suitable only for new covers.

To this end, the cover $1_2$ represented in FIGS. 2A and 2B differs from that which is represented in FIGS. 1A and 1B in that, instead of being provided with a bottom plate PL screwed to the wall 1a, the cover $1_2$ has a wall 10a of rectangular section so as to form a cavity CA which is oriented toward the inside of the inspection chamber CV when the cover $1_2$ is in closed position. The cover $1_2$ is also pierced right through with a through opening $OC_2$ which is configured so that, when the cover $1_2$ is in closed position, one of the ends of the through opening $OC_2$ emerges toward the outside and the other end of the through opening $OC_2$ emerges toward the inside of the inspection chamber CV.

In the example represented, the through opening $OC_2$ has a quadrangular section. According to other examples that are not represented, the section of the through opening $OC_2$ can be tapered, cylindrical, oval, etc. The size, the form and the positioning of the through opening $OC_2$ depend on the mechanical stresses desired for the cover $1_2$.

As in the embodiment represented in FIGS. 1A and 1B, the wall 10a of the cover $1_2$ is for example provided with a central web 10b and with several reinforcing ribs 10c which are made of a piece with the wall 10a and which extend respectively protruding into the opening OCV of the inspection chamber CV, when the cover $1_2$ is in closed position.

Like the embodiment represented in FIGS. 1A and 1B, the through opening $OC_2$ is also filled with a sealing material ME which is in all respects identical to that described with reference to FIGS. 1A and 1B. In the example represented in FIGS. 2A and 2B, the sealing material is injected into the cavity CA of the cover $1_2$, through the through opening $OC_2$, via any suitable industrial method.

A third embodiment of the cover according to the invention will now be described with reference to FIGS. 3A and 3B.

In the example represented, the cover is denoted by the reference $1_3$. The cover $1_3$ is for example identical to the cover $1_1$ of FIGS. 1A and 1B. To this end, it comprises a flat wall 100a, a central web 100b and reinforcing ribs 100c that are identical to those of the cover $1_1$.

The cover $1_3$ is distinguished from the cover $1_1$ by the fact that it comprises a radiating element ER.

More particularly, in the example represented, the radiating element ER is completely embedded in the sealing material ME.

In the example represented, the radiating element ER is a printed antenna containing two poles P1, P2 which are linked together by a conductor (not represented) covered by a shielding BD and electrically insulated therefrom. The radiating element ER is arranged in the sealing material ME in such a way that, when the cover $1_3$ is in closed position:
  the pole P1 extends in proximity to the through opening OC of the cover $1_3$, to approximately 5 to 10 mm from the outer surface of the wall 100a of the cover $1_3$ in order to protect the antenna from the outside stresses (rolling traffic, pedestrian traffic, dropped objects, etc.),
  the pole P2 extends in proximity to the through hole OPL of the plate PL of the cover $1_3$, by being substantially parallel to the pole P1,
  the shielding BD extends in the sealing material ME between the poles P1 and P2.

The shielding BD is also linked to a crinkle washer or a lug CS of metal type, via a conductive metal wire FC.

Thus, when mounting the cover $1_3$, when the plate PL is screwed to the wall 100a thereof by tightening the nuts E1 and E2, the shielding BD is electrically linked to the cover $1_3$, thereby producing a grounding of the shielding BD.

In the example represented:
- the pole P1 extends according to an orientation substantially parallel to that of the wall 100a of the cover $1_3$,
- the pole P2 extends according to an orientation substantially parallel to that of the plate PL of the cover $1_3$,
- the shielding BD extends at right angles to the poles P1 and P2.

Obviously, the orientation of the pole P1 with respect to the wall 100a of the cover $1_3$ and the orientation of the pole P2 with respect to the plate PL of the cover can vary according to the configuration of the cover.

Thus, according to other examples:
- the pole P1 could be inclined toward the inside of the cover, forming a given angle with respect to the wall 100a of the cover,
- the pole P2 could be inclined either toward the plate 100a of the cover, or toward the inside of the inspection chamber, forming a given angle with respect to the plate PL of the cover.

In this example, the shielding BD would then link the poles P1 and P2 without being at right angles thereto.

According to a particular example:
- the pole P1 could be inclined toward the inside of the cover, being at right angles to the wall 100a of the cover,
- the pole P2 could be inclined toward the inside of the inspection chamber, being at right angles to the plate PL of the cover.

Referring now to FIGS. 4A to 4D, four different variants of the radiating element ER, according to which the radiating element ER is contained only partly in the sealing material ME, are respectively represented.

In FIG. 4A, the radiating element ER contains a printed antenna P1a and a quarter-wave antenna P2a which are linked together by a conductor (not represented) covered with a shielding BD and electrically insulated therefrom. The radiating element ER is arranged partly in the sealing material ME in such a way that, when the cover $1_3$ is in closed position:
- the printed antenna P1a extends, for example, longitudinally in the through opening OC of the cover $1_3$, at approximately 5 to 10 mm from the outer surface of the wall 100a of the cover $1_3$,
- the shielding BD extends in the sealing material ME toward the inside of the inspection chamber CV, for example at right angles to the printed antenna P1a,
- the quarter-wave antenna P2a extends outside the sealing material ME, in the extension of the shielding BD, and toward the inside of the inspection chamber CV, for example at right angles to the printed antenna P1a.

The shielding BD is also linked to a crinkle washer or a lug CS of metal type, via a conductive metal wire FC.

In FIG. 4B, the radiating element ER contains a printed antenna P1b and a helical antenna P2b which are linked together by a conductor (not represented) covered with a shielding BD and electrically insulated therefrom. The radiating element ER is arranged partly in the sealing material ME in such a way that, when the cover $1_3$ is in closed position:
- the printed antenna P1b extends, for example, longitudinally in the through opening OC of the cover $1_3$, at approximately 5 to 10 mm from the outer surface of the wall 100a of the cover $1_3$,
- the shielding BD extends in the sealing material ME toward the inside of the inspection chamber CV, for example at right angles to the printed antenna P1a,
- the helical antenna P2b extends outside the sealing material ME, in the extension of the shielding BD, and toward the inside of the inspection chamber CV, for example at right angles to the printed antenna P1b.

The shielding BD is also linked to a crinkle washer or a lug CS of metal type, via a conductive metal wire FC.

In FIG. 4C, the radiating element ER contains a helical antenna P1c and a quarter-wave antenna P2c which are linked together by a conductor (not represented) covered with a shielding BD and electrically insulated therefrom. The radiating element ER is arranged partly in the sealing material ME in such a way that, when the cover $1_3$ is in closed position:
- the helical antenna P1c extends, for example, longitudinally in the through opening OC of the cover $1_3$, at approximately 5 to 10 mm from the outer surface of the wall 100a of the cover $1_3$,
- the shielding BD extends in the sealing material ME toward the inside of the inspection chamber CV, for example at right angles to the helical antenna P1c,
- the quarter-wave antenna P2c extends outside the sealing material ME, in the extension of the shielding BD, and toward the inside of the inspection chamber CV, for example at right angles to the helical antenna P1c.

The shielding BD is also linked to a crinkle washer or a lug CS of metal type, via a conductive metal wire FC.

In FIG. 4D, the radiating element ER contains a helical antenna P1d and a helical antenna P2d which are linked together by a conductor (not represented) covered with a shielding BD and electrically insulated therefrom. The radiating element ER is arranged partly in the sealing material ME in such a way that, when the cover $1_3$ is in closed position:
- the helical antenna P1d extends, for example, longitudinally in the through opening OC of the cover $1_3$, at approximately 5 to 10 mm from the outer surface of the wall 100a of the cover $1_3$,
- the shielding BD extends in the sealing material ME toward the inside of the inspection chamber CV, for example at right angles to the helical antenna P1d,
- the helical antenna P2d extends outside the sealing material ME, in the extension of the shielding BD, and toward the inside of the inspection chamber CV, for example at right angles to the helical antenna P1d.

The shielding BD is also linked to a crinkle washer or a lug CS of metal type, via a conductive metal wire FC.

The radiating element ER which has just been described with reference to FIGS. 3A, 3B and 4A to 4D can obviously be installed in the same way in the sealing material ME of the cover $1_2$ represented in FIGS. 2A and 2B.

A fourth embodiment of the cover according to the invention will now be described with reference to FIGS. 5A and 5B.

In the example represented, the cover is denoted by the reference 14. The cover 14 is for example identical to the cover $1_1$ of FIGS. 1A and 1B. To this end, it comprises a flat wall 110a, a central web 110b and reinforcing ribs 110c that are identical to those of the cover $1_1$.

The cover $1_4$ is distinguished from the cover $1_1$ by the fact that the sealing material ME also has a protuberance PB which, when the cover $1_4$ is in closed position, is arranged protruding out of the through opening OC.

The protuberance PB comprises a diffraction device DF. In the example represented in FIGS. 5A and 5B, the diffraction device DF comprises one or more diffraction elements of metal type which ensure the diffraction of the radiofrequency signals SRF transmitted by the radiofrequency transmission device DT. In the example represented, two rows, each of four diffraction elements, are disposed in the top part of the protuberance PB when the cover 14 is in closed position. The diffraction elements represented by black triangles in FIGS. 5A and 5B are configured to have different angles and are positioned relative to one another in the sealing material ME irregularly.

Thus, metal chips can act as diffraction elements. The metal chips are generally obtained from the machining of parts on machine-tools and are often of a spiral form. By selecting (or by producing) metal chips having the form of a single turn, they are then introduced into the sealing material ME.

Such an arrangement of the diffraction device DF protruding on the cover 14 advantageously makes it possible to generate diffractions which favor the propagation of the radiofrequency signals according to at least two directions each having an angle of low value (for example 3 to 5 degrees) with respect to a straight line which can be, for example:
  horizontal, in the case where the cover 14 in closed position extends horizontally, as in the case of FIGS. 5A and 5B,
  vertical, in the case where the cover in closed position extends vertically.

The protuberance PB incorporating such diffraction elements which has just been described with reference to FIGS. 5A and 5B can obviously also constitute the sealing material ME of the cover $1_2$ represented in FIGS. 2A and 2B and of the cover $1_3$ represented in FIGS. 3A, 3B and 4A to 4D.

Two variant embodiments of the covers described above will now be described with reference to FIGS. 6A and 6B.

In the example represented in FIG. 6A, the cover, represented in plan view, is denoted by the reference $1_6$. The cover $1_6$ is for example identical to the covers described previously. To this end, it comprises a flat wall 120a, a central web 120b and reinforcing ribs 120c. In the interests of clarity of FIG. 6A, the cover $1_6$ is represented here without the sealing material.

The cover $1_6$ of FIG. 6A is distinguished from the covers described previously by the fact that it comprises two through openings $OC_{61}$ and $OC_{62}$, the particular feature of which is that they are disposed at right angles to one another so as to favor the propagation both of the vertical component of the radiofrequency signal SRF and of the horizontal component thereof.

In the example represented, the through openings $OC_{61}$ and $OC_{62}$ each have a rectangular section and are of longitudinal form. According to other examples that are not represented, the section of these through openings can be cylindrical, tapered, oval, etc. The size, the form and the positioning of the through openings $OC_{61}$ and $OC_{62}$ depend on the mechanical stresses desired for the cover $1_6$.

According to other examples, the cover $1_6$ could be pierced with other through openings of a form and/or section and/or size different or not from that of the through openings $OC_{61}$ and $OC_{62}$.

In the example represented in FIG. 6B, the cover, represented in plan view, is denoted by the reference $1'_6$. The cover $1'_6$ is for example identical to the covers described previously. To this end, it comprises a flat wall 130a, a central web 130b and reinforcing ribs 130c. In the interests of clarity of FIG. 6B, the cover $1'_6$ is represented here without the sealing material.

The cover $1'_6$ of FIG. 6B is distinguished from the covers described previously by the fact that it comprises four through openings $OC'_{61}$, $OC'_{62}$, $OC'_{63}$, $OC'_{64}$ which are disposed for example in line, thus ensuring a greater propagation of the radiofrequency signal SRF.

In the example represented, the through openings $OC'_{61}$, $OC'_{62}$, $OC'_{63}$, $OC'_{64}$ each have a cylindrical section. According to other examples that are not represented, the section of these through openings can be rectangular, tapered, oval, etc. The size, the form and the positioning of these through openings depend on the mechanical stresses desired for the cover $1'_6$.

According to other examples, the cover $1'_6$ could be pierced with other through openings of a form and/or section and/or size different or not from that of the through openings $OC'_{61}$, $OC'_{62}$, $OC'_{63}$, $OC'_{64}$. As a variant, the through openings $OC'_{61}$, $OC'_{62}$, $OC'_{63}$, $OC'_{64}$ could each be of different form and/or size and/or section and be positioned differently from FIG. 6B.

Two variant embodiments of the cover represented in FIGS. 2A and 2B will now be described with reference to FIGS. 7A and 7B.

In the example represented in FIG. 7A, the cover, represented in cross-sectional view, is denoted by the reference $1_7$. As in FIGS. 2A and 2B, the cover $1_7$ has a wall 140a, a central web 140b, reinforcing ribs 140c and a through opening $OC_7$. The wall 140a forms a cavity $CA_7$ filled with the abovementioned sealing material ME. In the example represented, the section of the cavity $CA_7$ is trapezoidal.

The cover $1_7$ is distinguished from that of FIG. 2B in that the inner surface of the through opening $OC_7$ comprises two tapered portions $CON_{71}$ and $CON_{72}$, the tops of which meet. Such a conformation of the inner surface of the opening $OC_7$ makes it possible to give the sealing material ME injected into the cavity $CA_7$ a natural mechanical strength. Furthermore, such a conformation of the inner surface of the opening $OC_7$ makes it possible to better reflect the radiofrequency signal SRF toward the outside and substantially parallel to the wall 140a, for example according to the two directions D1, D2 represented in FIG. 7A and each having an angle α of low value (for example 3 to 5 degrees) with respect to the outer surface of the wall 140a of the cover $1_7$.

Although the section of the tapered portions $CON_{71}$ and $CON_{72}$ are, here, rectangular, in other exemplary embodiments, the section of these tapered portions could be square, circular or other.

In the example of FIG. 7B, the cover denoted by the reference $1'_7$ is identical to the cover $1_7$ except for the fact that the sealing material ME is injected only into the first tapered portion $CON_{71}$ of the opening $OC_7$.

It goes without saying that the embodiments which have been described above have been given in a purely indicative and nonlimiting manner, and that many modifications could easily be made by the person skilled in the art, without in any way departing from the framework of the invention.

The invention claimed is:

1. An inspection chamber cover configured for use with a chamber having an access opening and configured to contain a wireless radiofrequency signal transmission device, the cover comprising:
  a wall configured to cover the access opening of the inspection chamber when the cover is in a closed position, and
  a through opening extending through the wall of the cover and filled with a cover sealing material, the cover sealing material extending over a surface of the wall of the cover oriented toward the inside of the inspection chamber when the cover is in closed position, such that the radiofrequency signal transmission device is only separated from the outside of the chamber by the cover, the cover sealing material sealing the cover against fluids or miscellaneous particles, the cover sealing material comprising a material transparent to the propagation of a radiofrequency signal transmitted from and/or to the transmission device.

2. The cover of claim 1, wherein the through opening comprises a first longitudinal through opening, and wherein the cover additionally comprises a second longitudinal through opening extending through the wall of the cover, the first and second longitudinal through openings arranged at right angles to one another.

3. The cover of claim 1, wherein the cover sealing material contains at least one radiating element.

4. The cover of claim 3, wherein the at least one radiating element comprises first and second parts linked together by a conductive element covered with a shielding and electrically insulated from said shielding, the shielding being linked to the wall of the cover and the at least one radiating element being arranged at least partly in the sealing material so that, when the cover is in closed position:

the first part of the radiating element is arranged, according to a given orientation with respect to the wall of the cover, in proximity to an end of the through opening of the cover which emerges toward the outside of the cover, the second part of the radiating element is arranged, according to a given orientation with respect to the wall of the cover, in proximity to an end of the through opening which emerges toward the inside of the inspection chamber.

5. The cover of claim 1, wherein the sealing material of the cover comprises a protuberance at an end of the through opening which emerges toward the outside of the cover, when the cover is in closed position, protuberance incorporating a diffraction device.

* * * * *